United States Patent
Pandya

(10) Patent No.: US 11,627,612 B2
(45) Date of Patent: Apr. 11, 2023

(54) METHOD AND APPARATUS FOR EFFICIENT VEHICLE DATA REPORTING

(71) Applicant: FORD GLOBAL TECHNOLOGIES, LLC, Dearborn, MI (US)

(72) Inventor: Ritesh Pandya, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1308 days.

(21) Appl. No.: 15/465,014

(22) Filed: Mar. 21, 2017

(65) Prior Publication Data
US 2018/0279201 A1   Sep. 27, 2018

(51) Int. Cl.
| | |
|---|---|
| H04W 40/22 | (2009.01) |
| H04L 29/08 | (2006.01) |
| H04W 76/10 | (2018.01) |
| H04L 67/12 | (2022.01) |
| H04L 45/00 | (2022.01) |
| H04W 40/12 | (2009.01) |
| H04W 84/12 | (2009.01) |
| H04W 84/00 | (2009.01) |

(52) U.S. Cl.
CPC ............ *H04W 76/10* (2018.02); *H04L 45/22* (2013.01); *H04L 67/12* (2013.01); *H04W 40/12* (2013.01); *H04W 84/005* (2013.01); *H04W 84/12* (2013.01)

(58) Field of Classification Search
CPC ... H04W 84/12; H04W 76/10; H04W 84/005; H04W 4/48; H04W 4/14; H04W 4/40
See application file for complete search history.

(56) References Cited

U.S. PATENT DOCUMENTS

| | | | | |
|---|---|---|---|---|
| 8,768,565 | B2* | 7/2014 | Jefferies | B60R 25/24 701/32.7 |
| 9,332,559 | B2 | 5/2016 | Pan et al. | |
| 2004/0252027 | A1* | 12/2004 | Torkkola | G08B 21/06 340/576 |
| 2009/0193320 | A1* | 7/2009 | Furbeck | H04L 1/0045 714/786 |
| 2009/0259349 | A1* | 10/2009 | Golenski | G08G 1/205 701/2 |
| 2011/0215758 | A1* | 9/2011 | Stahlin | G07C 5/008 320/109 |
| 2013/0185072 | A1* | 7/2013 | Huang | G10L 21/06 704/246 |
| 2013/0219039 | A1 | 8/2013 | Ricci | |
| 2014/0245003 | A1* | 8/2014 | Barker | H04L 63/08 713/168 |
| 2014/0274069 | A1* | 9/2014 | Scheim | H04W 28/08 455/444 |

(Continued)

FOREIGN PATENT DOCUMENTS

| | | |
|---|---|---|
| CN | 102045674 A | 5/2011 |
| CN | 104954420 A | 9/2015 |

*Primary Examiner* — Romani Ohri
(74) *Attorney, Agent, or Firm* — Joseph Zane; Brooks Kushman P.C.

(57) ABSTRACT

A system includes a processor configured to send data, for transmission to a remote computer, to a local wireless device in communication with a vehicle computer including the processor, the sending responsive to a determination that a remote cellular connection cannot be established via a vehicle modem, and the data including an instruction for the device to transmit the data to the remote computer.

16 Claims, 3 Drawing Sheets

(56) References Cited

U.S. PATENT DOCUMENTS

| | | | |
|---|---|---|---|
| 2015/0065132 A1* | 3/2015 | Ramkumar | H04W 52/0241 |
| | | | 455/435.3 |
| 2015/0081399 A1* | 3/2015 | Mitchell | G06Q 10/0639 |
| | | | 705/7.38 |
| 2015/0271858 A1* | 9/2015 | Chu | H04W 4/80 |
| | | | 455/41.2 |
| 2015/0327129 A1* | 11/2015 | Faccin | H04W 36/0055 |
| | | | 370/331 |
| 2015/0358798 A1* | 12/2015 | Okawa | H04W 8/18 |
| | | | 455/404.2 |
| 2017/0055201 A1* | 2/2017 | Murray | H04W 48/16 |
| 2018/0103355 A1* | 4/2018 | Hergesheimer | H04W 4/80 |
| 2018/0255486 A1* | 9/2018 | Kumar | H04W 36/0022 |

* cited by examiner

METHOD AND APPARATUS FOR EFFICIENT VEHICLE DATA REPORTING

TECHNICAL FIELD

The illustrative embodiments generally relate to methods and apparatuses for efficient vehicle data reporting.

BACKGROUND

Modern connected vehicles often use a vehicle-embedded cellular modem (typically known as TCU—Telematics Control Unit) to send vehicle data to the cloud (back-end server). The cloud then provides this information to a vehicle owner or driver, which that person can use via a phone application on a smart phone. This in vehicle-embedded cellular modem uses cellular technologies (2G, 3G, 4G/LTE, etc.) to talk to the cloud and an in-vehicle communication channel, such as a controller area network (CAN) bus to talk to other electronic control unit (ECUs) modules within the vehicle. There are certain pre-defined scenarios based on which in-vehicle embedded cellular modem triggers data collection within the vehicle and then sends that data to the cloud using cellular connectivity.

A common scenario used by many original equipment manufacturers (OEMs) is to send data to the cloud at the key-off. This data assists users with the latest vehicular information (e.g. vehicle location, fuel level, battery state of charge, engine oil level, other warning lights etc.) about a vehicle at the time of the last key-off. The data can also be useful to manufacturers to track various information about vehicular usage and states.

Given that this solution heavily relies on cellular connectivity, if user keys off the vehicle at the location where there is poor or no cellular connection (e.g. covered multistory parking structure, metal shade, garage etc.), the in-vehicle embedded cellular modem may not be able to send the latest information to the cloud at key-off. This means a user may only be able to see the status of the vehicle from a time when an in-vehicle cellular modem would have provided this information to the cloud upon a last pre-defined scenario prior to the key-off. This scenario could be miles away from the key-off location and could be hours prior to the key-off event.

SUMMARY

In a first illustrative embodiment, a system includes a processor configured to send data, for transmission to a remote computer, to a local wireless device in communication with a vehicle computer including the processor, the sending responsive to a determination that a remote cellular connection cannot be established via a vehicle modem, the data including an instruction for the device to transmit the data to the remote computer.

In a second illustrative embodiment, a system includes a processor configured to search for both a local user wireless device and a local Wi-Fi connection, responsive to a determination that a cellular connection is unavailable for use in transmitting a data request to a remote server. The processor is also configured to send the data request to the local wireless device, responsive to a determination that the local Wi-Fi connection is unavailable. The processor is further configured to attempt to use the first available of the cellular connection and the local Wi-Fi connection, to send the data request and instruct the local wireless device to delete the data request, responsive to successfully sending the data request via the cellular or local Wi-Fi connection.

In a third illustrative embodiment, a computer-implemented method includes packaging vehicle data for remote wireless transmission, responsive to a determination that a predefined vehicle-reporting condition is met. The method also includes sending the data to a locally, wirelessly connected mobile device, responsive to a determination that a cellular signal, received by a vehicle modem, is below a predefined threshold level when transmission of the vehicle data is attempted by the modem and instructing the mobile device to transmit the data to the remote source.

DETAILED DESCRIPTION

As required, detailed embodiments are disclosed herein; however, it is to be understood that the disclosed embodiments are merely illustrative and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
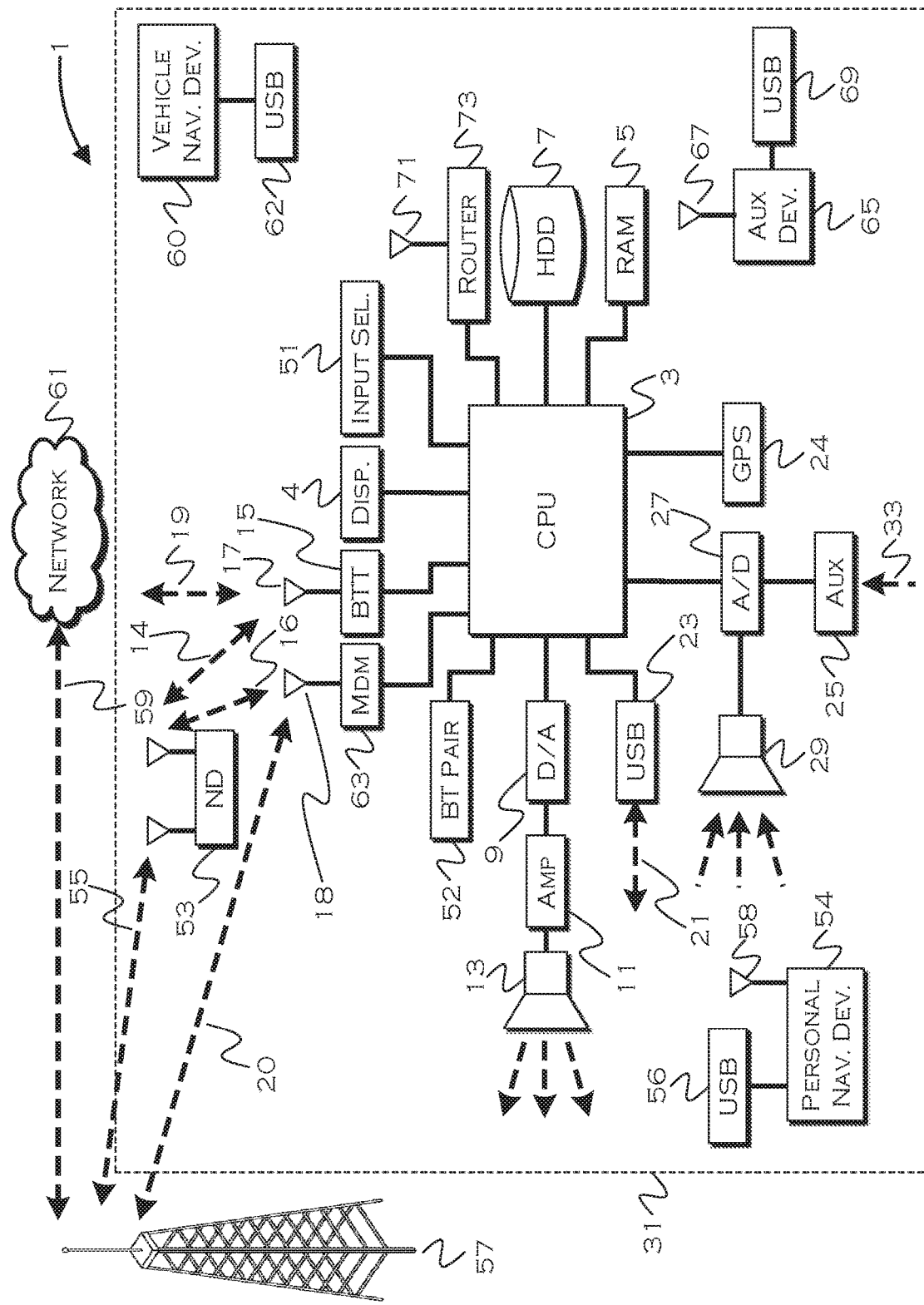
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLU- ETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments propose alternative solutions for sending vehicle data to the cloud when an in-vehicle embedded cellular modem is not able to send data (due to poor or no cellular coverage). The illustrative embodiments can use other devices, such as a user device, to which the data can also be transmitted. The transmitted data can include an instruction to send the data to the cloud when remote connectivity can be established. Since the vehicle to device communication will not typically be blocked by whatever is interfering with the remote cellular connection (as it is a local, relatively unimpeded signal), the vehicle is capable of transmitting data to a user device. If the user then carries the device to a location where connectivity is available, the device can then perform the remote transmission, responsive to the instructions.

Illustrative examples are provided to demonstrate non-limiting implementation of possible solutions. In these illustrative solutions, the user has agreed to send data from in vehicle embedded cellular modem to phone apps within other users' cellular phones to be sent to the cloud. In a larger network sense, multiple users could agree to act as carriers of data on behalf of other users, such that a user passing by a vehicle without connectivity could "grab" a data packet delivered by the vehicle to a passerby device and then the passerby device could send the data on behalf of the vehicle. This might be acceptable if data is limited in size and/or otherwise does not adversely affect an assisting user's data plan. This would also require a level of authentication and security to ensure that only authorized phones could participate in the data-carrier schema, and may be facilitated, for example, by an OEM provided application on the carrier mobile devices with which a secure handshake and data exchange can be made.

Users can also elect to have a vehicle connect to an available Wi-Fi or other access point, if cellular connectivity is not present. This assists the user in delivering the data via another possible medium. The user could also selectively enable certain connections and not others, such as specific Wi-Fi access points, if security was a concern.

Using a local device to "ferry" a data packet to an area of signal strength can occur under several non-limiting scenarios, presented for illustration purposes. The user may actually have a registered account with the vehicle (own vehicle or family vehicle), the vehicle may use a Wi-Fi connection provided by the local device, leveraging the Wi-Fi to send a direct transmission, or the local device receives an encrypted form of the data via an OEM provided application, and stores the data until the application detects a usable signal, usable to complete the transmission.

In one illustrative example, if an in-vehicle embedded cellular modem detects an event that requires it to send data to the cloud and if a telematics control unit or other telematics module determines that a signal strength is less than pre-defined value, the vehicle will send needed data to a vehicle computing module, having local wireless connection capability, using an in-vehicle communication channel. The vehicle computing module will then send this data to a customer's Bluetooth connected phone.

In this paradigm, the data from in vehicle computing system would be passed on to an OEM application, for example, executing on user's mobile phone using a secure and authenticated Bluetooth connection. The application could then securely send this data to cloud. If a customer's smart phone has sufficient connectivity to transmit the data, the data could be sent to cloud immediately. If customer's mobile phone doesn't have a sufficient signal, the phone may send the data to the cloud when the phone obtains an adequate signal. Alternatively, the in-vehicle embedded cellular modem could send the data using a cellular connection if that connection becomes available first. In the latter case, if the vehicle sends the data and can still communicate with the phone, the vehicle may instruct the phone to de-queue the data for transmission.

If multiple users are participating in a multi-user shared transfer system (whereby any suitable phone may be used to send the data), if the vehicle is able to send the data first, the vehicle may connect to any phones which the vehicle has instructed to send the data, and instruct those phones not to send the data. In this type of scenario, the vehicle may communicate with any passing phone to request transmission, and/or the vehicle may connect to the passing phone in another example only if the vehicle was unable to instruct a user-device to send the data.

In still a further example, if an in-vehicle cellular embedded modem is equipped with Wi-Fi capability and if an in-vehicle transmission event happens in the location where in vehicle embedded cellular modem is connected or can connect securely to a Wi-Fi hotspot, then upon detecting an event that requests an embedded modem to send data to cloud, the modem could securely connect to an available Wi-Fi access point and send data to the cloud (in the absence of cellular connectivity, for example). If the in-vehicle embedded cellular modem cannot connect securely to the Wi-Fi hotspot, the modem will connect when the access point becomes securely available. In these models, the vehicle modem uses either connection to send data to the cloud, depending on which connection becomes available first. As before, if any wireless device instructed to send the data is still in communication with the vehicle (or can be communicated with by the vehicle), the vehicle may instruct the device to cease attempts to send the data. In at least one example, the data may have a marker or other identifier associated therewith, and if the wireless device (or vehicle modem) connects to the cloud to send the data, the device or modem may be able to determine if the data was already sent (i.e., the cloud already received data with that identifier) and thus forego transmission of the data.

Communication with a local wireless connection (device or hotspot) can be achieved through any suitable connection source from the vehicle. That is, if the vehicle computer has Wi-Fi capability, but the modem does not, the vehicle computer could still connect to a local Wi-Fi access point to send the data.

Figure 2:
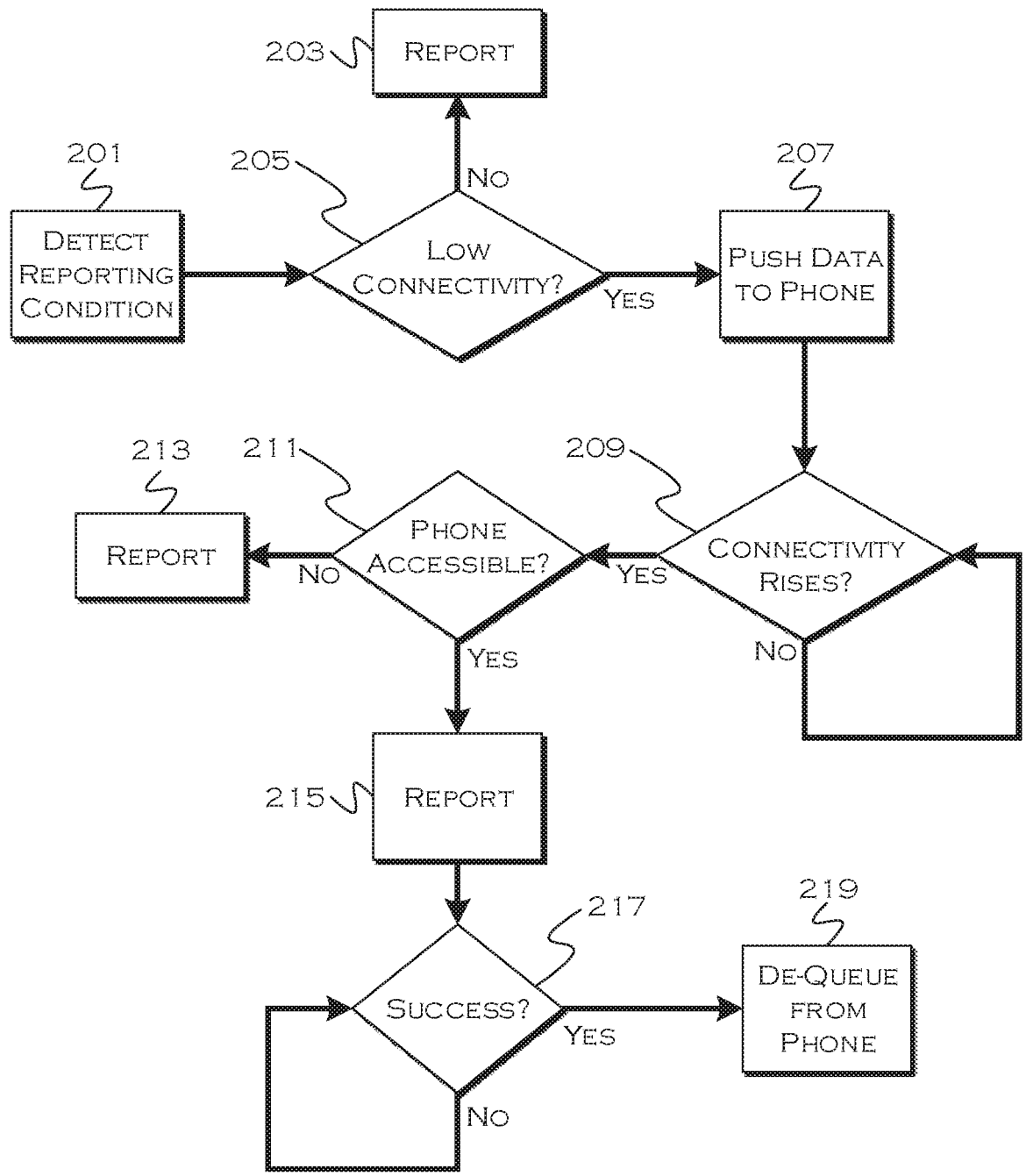
FIG. 2 shows an illustrative process for reporting handling.

FIG. 2 shows an illustrative process for reporting handling. In this illustrative example, the process detects 201 a condition indicating a report is appropriate. This can include a variety of conditions, and it can also be the case that a vehicle periodically reports state data and other vehicle data to the cloud. Example reporting conditions include, but are not limited to, vehicle fuel or fluid levels falling below predetermined levels (which can also be OEM and/or user designated), the vehicle being powered down, the occurrence of a predetermined maintenance condition requiring user attention, etc. In the shut-down case, for example, a vehicle may simply report the state of the vehicle (fuel, charge level, mileage, recommended actions, etc) each time the vehicle powers down. A user can view this information through an application or on a website if desired.

When a report is attempted, the process determines 203 if there is sufficient connectivity for a cellular modem to send the data. If connectivity is sufficient, the process reports 205 the data. If the connectivity is not sufficient, the process may attempt to push 207 the data to a local user wireless device. This may also include transmission instructions for the data, or some indicator that the data is intended for transmission.

Once the data is on the device, both the device and vehicle modem may be attempting to transmit the data to a remote source. If the vehicle computer also establishes a local Wi-Fi connection, transmission may also be attempted over that connection. If local connectivity rises 209 to a level where the vehicle modem (or vehicle computer) can transmit the data, the process may determine 211 if the user device is still connected or available. If not, the process may simply transmit 213 the data based on the re-established local connectivity (which may also be done redundantly by the user device at a later time). In some cases, the vehicle may only preserve local connectivity and cellular connectivity for a period of time following shutdown. In other cases, the vehicle may be capable of waking to check for a cellular or local Wi-Fi signal, even after a session expires following shutdown.

If a local connection with the user device is available, the process may report 215 the data. If the data report is successful 217, the process may instruct 219 the phone to delete/dequeue the data. The data may also include a message in the header, indicating a source, so the remote receiving computer can determine the source.

Figure 3:
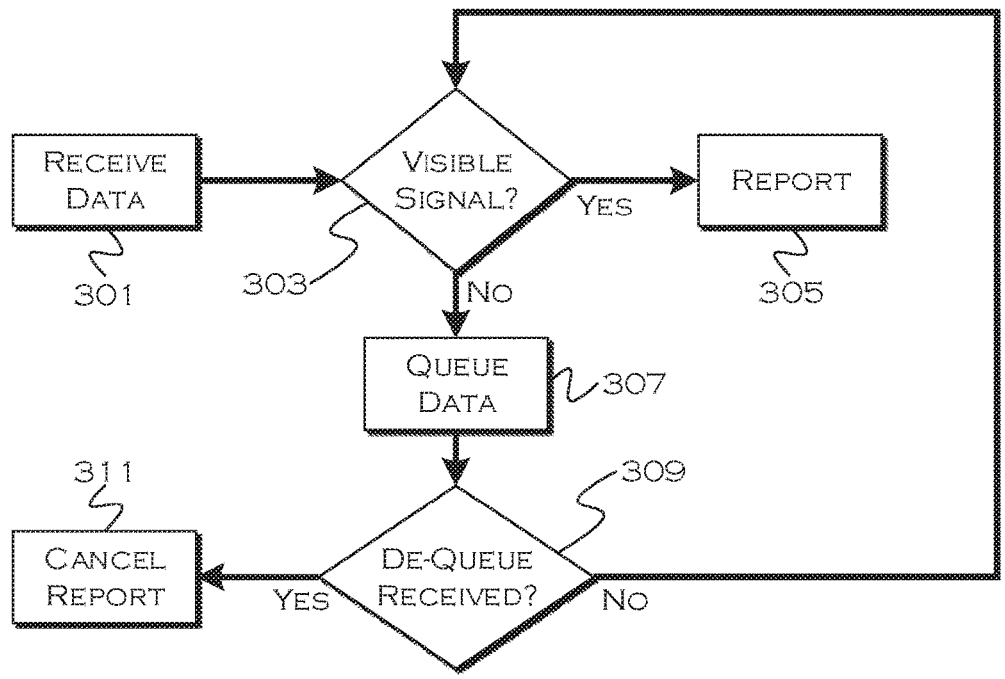
FIG. 3 shows an illustrative process for report queuing.

FIG. 3 shows an illustrative process for report queuing. In this illustrative example, a mobile device receives 301 the data from a vehicle. This could be a user device (occupant device), or, if a multi-device sharing process were in effect, the device of any passerby who is participating in the process. If a stranger's device is used, the vehicle would likely encrypt the data before transmission to the device. Of course, the data can also be encrypted before transmission to even a known user's device.

Once the device has received the signal, the process determines 303 if the device has sufficient signal to send the data to the remote system. Typically this will involve a cellular connection, but the mobile device could also be used in conjunction with a local or other wireless connection to transmit the data. If there is a connection that can be used to send the data, the device will report the data pursuant to the request.

If there is not a connection, the process will continue to search for a connection. In this example, the device 307 may queue the data. If the vehicle attempts multiple reports in the absence of a usable connection, it is possible for the device to queue multiple instances of the reports as data to be transmitted when a usable connection is available.

As previously noted, the process will continue to search for a connection, but if the vehicle is able to successful transmit the data at some point (because the vehicle can establish a connection), the vehicle may also instruct the device to delete or de-queue the data 309. If the device receives such an instruction from the vehicle, the process may cancel 311 reporting of the data.

The data may also have a data identifier associated therewith. This can be reported to the remote system by whichever device reports the data. To avoid possible redundancy of transmission, each reporting device may request information from the remote system relating to any recently received data transmissions relating to a particular vehicle. The remote system may send back the identifier of the most recently received transmission(s). The device requesting and receiving this information can use this information to determine if the data was successfully sent by another device, before sending its own data payload. If the identifying information indicates that the data was successfully transmitted, the requesting device may delete the payload corresponding to the successfully transmitted data.

Figure 4:
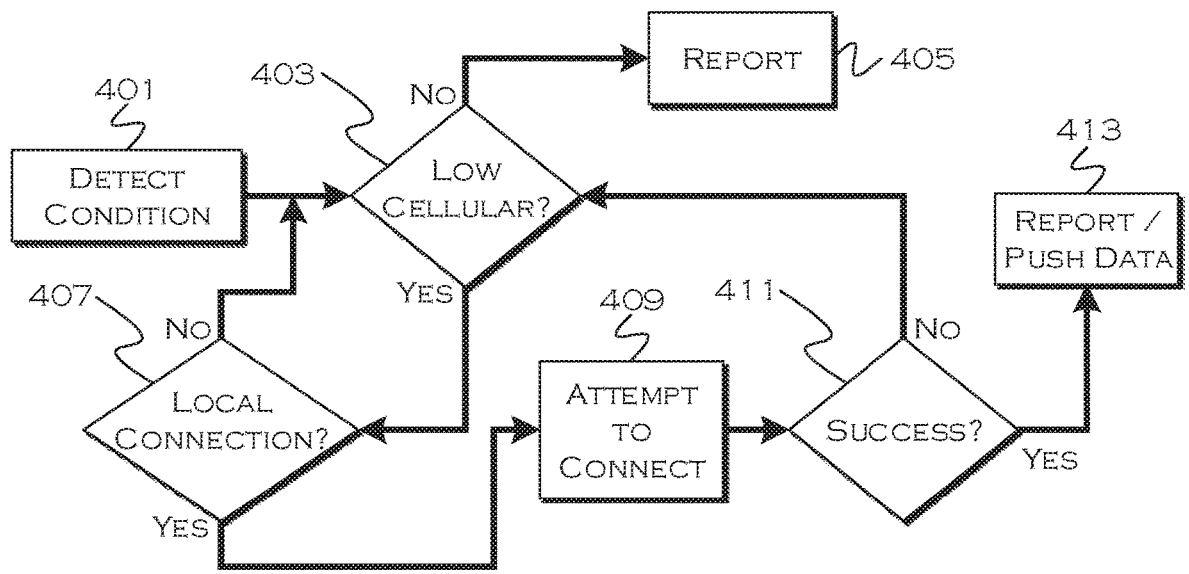
FIG. 4 shows another illustrative process for report handling.

FIG. 4 shows another illustrative process for report handling. In this example, the vehicle computer uses a local Wi-Fi or other connection if a cellular connection is unavailable or weak. For example, if a vehicle is traveling in an area of low connectivity, and a report is instructed, the process may first attempt to use a local device to transmit the data. If the local user device is unable to transmit the data as well, and/or in conjunction with an attempt to use the local user device, the process may search for a local Wi-Fi or other wireless connection.

If no connection to either the user device, a cellular network or a local wireless access point is available, the process may queue the data, and continue to search for both a cellular and local Wi-Fi connection. In this example, once a report condition is detected or determined 401, the process first attempts to use 403 a local cellular connection. If the connection is sufficient, the process may simply report the data 405.

If the connection is insufficient, the process may check 407 to see if there is a local connection available. This can include, for example, searching for a local Wi-Fi connection or other connection over which the data can be transmitted. If no local connection is available, the process may queue the data and continue to search for any usable connection over which to transmit the data.

If a local connection is available, the process may attempt to connect to the local connection 409. Simply because a local connection is available, does not mean the process will connect. The process may require a certain level of security over the connection, require a known connection, or require some other assurance about the security of transmitted information. If the appropriate parameters are present and the process succeeds 411 in connecting, the process can use the local wireless connection to report 413 the data.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A vehicle comprising: a processor configured to: send data, for transmission to a remote computer, to a smartphone in communication with the processor, the sending responsive to a determination that a remote cellular connection cannot be established via a modem of the vehicle, and the data including an instruction for the smartphone to transmit the data to the remote computers;

wherein the processor is configured to send an instruction to the smartphone to delete the data, responsive to a successful transmission of the data by the vehicle computer using a local Wi-Fi connection;

wherein the processor is configured to query the remote computer to determine if the data was already transmitted by the smartphone, responsive to having sent the data to the smartphone and in advance of transmitting the data via the vehicle modem upon re-establishment of the re mote cellular connection.

2. The vehicle of claim 1, wherein the query includes a request for an identifier associated with a data set most-recently received by the remote computer with regards to a specific vehicle identifier.

3. The vehicle of claim 2, wherein the determination that the data was already transmitted is based on comparison of the identifier received responsive to the query with an identifier stored by the processor with respect to the data.

4. The vehicle of claim 1, wherein the data is also sent responsive to detection of a condition pre-designated as a reporting event.

5. The vehicle of claim 4, wherein the reporting event includes a vehicle shut-down.

6. The vehicle of claim 4, wherein the reporting event includes a fuel level falling below a predetermined level.

7. The vehicle of claim 4, wherein the reporting event includes detection of a condition pre-designated as a maintenance condition.

8. A vehicle comprising:
a processor configured to:
search for both a local user smartphone and a local Wi-Fi connection, responsive to a determination that a cellular connection is unavailable for use in transmitting a data request to a remote server via a modem of the vehicle;
send the data request to the smartphone, including instructions for the smartphone to transmit the data to the remote server, responsive to a determination that the local Wi-Fi connection is unavailable determined based on the search for the local Wi-Fi connection;
use a first available of the cellular connection and the local Wi-Fi connection, to send the data request; and
instruct the smartphone to delete the data request, when the request has been sent to the smartphone, responsive to successfully sending the data request via the cellular or local Wi-Fi connection.

9. The vehicle of claim 8, wherein the smartphone is an occupant smartphone.

10. The vehicle of claim 8, wherein the smartphone is a smartphone passing by the vehicle.

11. The vehicle of claim 8, wherein the processor is configured to use only local Wi-Fi connections meeting predetermined specifications to send the data request.

12. The vehicle of claim 11, wherein the specification includes a requirement for a secure connection.

13. The vehicle of claim 11, wherein the processor is configured to encrypt the data request before sending the request to the remote server through the local Wi-Fi connection.

14. The vehicle of claim 8, wherein the processor is configured to query the remote server to determine if the data was already transmitted by the smartphone, responsive to having sent the data to the smartphone and in advance of transmitting the data via the first available of the cellular connection and the local Wi-Fi connection.

15. The vehicle of claim 14, wherein the query includes a request for an identifier associated with a data set most-recently received by the remote server with regards to a specific vehicle identifier, usable to identify whether the data was already transmitted by the smartphone.

16. The vehicle of claim 15, wherein the determination that the data was already transmitted is based on comparison of the identifier received responsive to the query with an identifier stored by the processor with respect to the data.

* * * * *